W. M. SHELTON.
FEATHER RENOVATOR.

No. 181,213.  Patented Aug. 15, 1876.

WITNESSES:
J. C. Kemon
L. A. Pettit

INVENTOR:
Wm. M. Shelton
BY
Kemon & Co.
ATTORNEYS.

UNITED STATES PATENT OFFICE.

WILLIAM M. SHELTON, OF WILLIAMSBURG, MISSOURI.

IMPROVEMENT IN FEATHER-RENOVATORS.

Specification forming part of Letters Patent No. 181,213, dated August 15, 1876; application filed June 27, 1876.

*To all whom it may concern:*

Be it known that I, WILLIAM M. SHELTON, of Williamsburg, in the county of Callaway and State of Missouri, have invented a new and useful Improvement in Feather-Renovators; and I do hereby declare that the following is a full, clear, and exact description of the same.

The invention is an improvement upon the feather-renovator constituting the subject of Letters Patent No. 108,161, the features of novelty being as hereinafter described and claimed.

Figure 1:
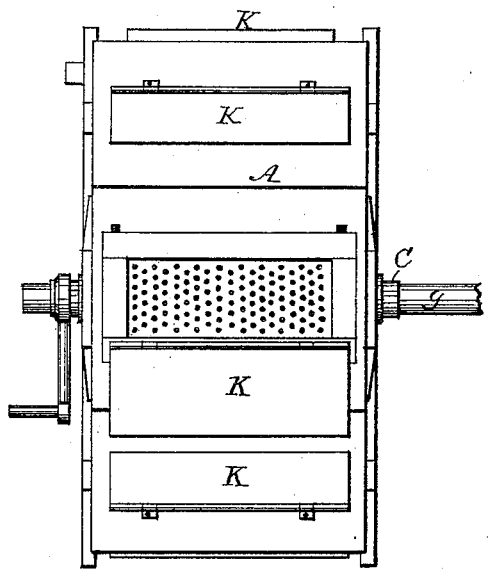
Figure 2:
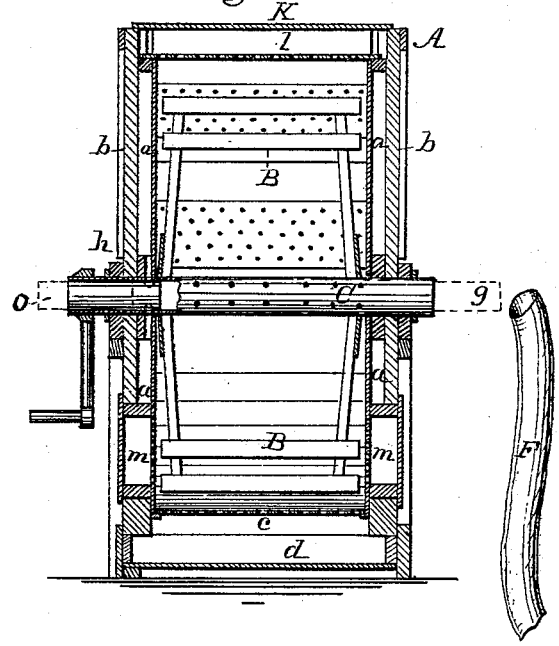
Figure 3:
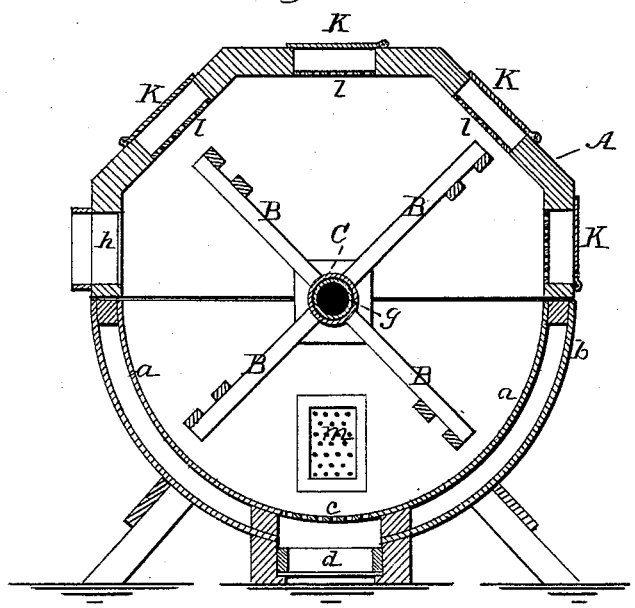

In the accompanying drawing, forming part of this specification, Figure 1 is a top view; Fig. 2, a vertical cross-section, and Fig. 3 a sectional elevation of my improved renovator.

The renovating-chamber A, which has an essentially cylindrical form, is constructed of a sheet-metal lining, $a$, and an exterior wooden casing, $b$, the same being separated by a narrow space, into which steam is received, as hereinafter described. The lining is perforated at the bottom $c$ of the cylinder, immediately over the sliding drawer $d$, which thus receives the foreign matter eliminated from the feathers in the renovating process. The reel B serves to agitate the feathers by its rotation, and the shaft C of the same is made hollow and perforated, as shown, to admit steam to the renovating-chamber. The steam is generated by any suitable heating apparatus, and conducted to the chamber A by a jointed or flexible pipe, $f$, connected to the pipe $g$, which latter is adapted to fit the interior of the reel-shaft C.

When the feathers have been subjected to the action of steam for a sufficient time, the pipe $g$ is pushed in to close the openings in the shaft C, and thus shut off the steam from the chamber, as in Fig. 2. The shaft C is provided with perforations at $h$ in its journal, coincident with openings in the bearings, and through these openings the steam escapes from pipe $g$ into the space between the lining $a$ and casing $b$, both upward and downward. The heat thus imparted to the lining $a$ by the steam filling said space is quickly communicated to the feathers, and has the desired effect of bleaching them. But for this purpose it is necessary that the doors $k$ of the several screens or gauze-covered openings $l$ in the cylinder shall remain closed. On the other hand, for drying the feathers the said doors $k$ require to be opened to allow the outer air to circulate through the first and second screens at the top of the case A, and the screens $m$ in the sides of the case near the bottom, while the heated air will tend to escape through the third and fourth screens at the top of the case. When dry, the feathers may be ejected through the slide-covered opening in the side of the cylinder. When steam is being admitted to the chamber through the body of the hollow reel-shaft, the openings $h$ in the journal thereof are closed by a plug, $o$, inserted in the end of the shaft, as shown. When the pipe $g$ is pushed into the shaft to shut off the steam, the plug $o$ is pushed or drawn out sufficiently to uncover the openings $h$, as shown in Fig. 2.

I do not claim, broadly, providing the casing of a feather-renovator with one or more gauze-covered openings having imperforate slides; but

What I claim is—

1. The combination, with the hollow perforated reel-shaft, of the sliding or detachable pipe $g$, substantially as shown and described.

2. The combination of the pipe $g$, having an imperforate body, with the reel-shaft, having perforations throughout its length and also in its journal, and the hollow casing, substantially as shown and described.

WILLIAM M. SHELTON.

Witnesses:
JOSEPH J. NEAL,
WILLIAM H. HALE,
GEO. YATES.